No. 880,078. PATENTED FEB. 25, 1908.
F. HOBBIS.
PROCESS FOR PREPARING FILTER PRESS PLATES.
APPLICATION FILED JULY 15, 1907.

Witnesses.
A. J. Davies
H. Parry.

Inventor:
Frank Hobbis

UNITED STATES PATENT OFFICE.

FRANK HOBBIS, OF WIDNES, ENGLAND.

PROCESS FOR PREPARING FILTER-PRESS PLATES.

No. 880,078.  Specification of Letters Patent.  Patented Feb. 25, 1908.

Application filed July 15, 1907. Serial No. 383,838.

*To all whom it may concern:*

Be it known that I, FRANK HOBBIS, a subject of Great Britain, residing at Widnes, England, have invented certain new and useful Improvements in the Preparation of Filter-Press Plates, of which the following is a specification.

This invention relates to a process for preparing the surfaces of the plates used in filter presses for expressing chemical or the like active liquors whereby plates that have become worn or corroded by the action of the press or the expressed liquors may be refaced and made serviceable again, or new plates may be treated in the manner hereinafter described with a view to increasing their durability.

Figure 1:
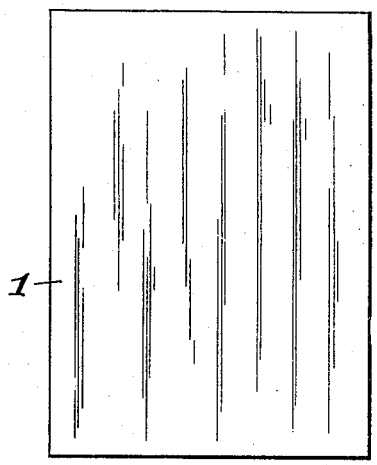
Figure 3:
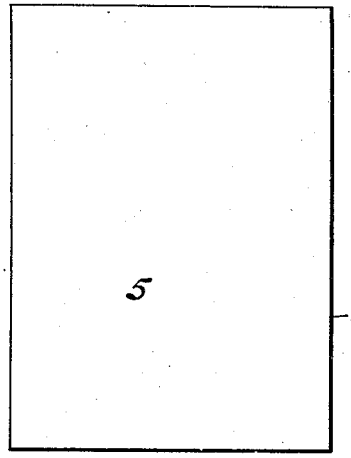
Figure 7:
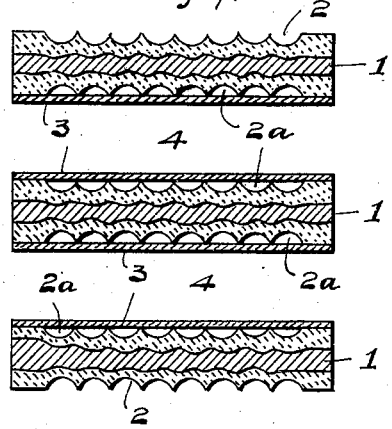
Figure 5:
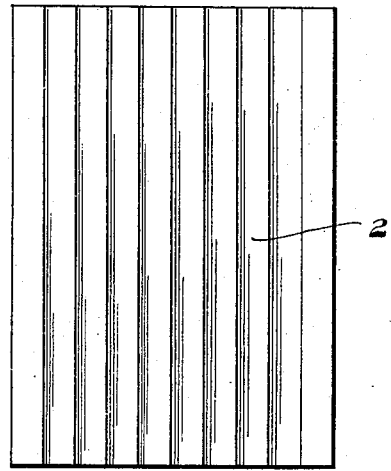
Figure 6:

The invention is partly illustrated in the accompanying drawings, in which,

Figures 1. and 2. are respectively an elevation and plan in section of an ordinary channeled filter press plate, showing the usual way in which such a plate wears; Figs. 3. and 4. are analogous views showing the first stage of refacing a worn plate; Figs. 5. and 6. are analogous views showing the subsequent channeling or combing of the plate; Fig. 7. shows the nesting of several plates.

Figure 2:
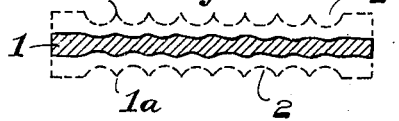
Figure 4:

The plates 1 used in filter presses for recovering liquors from waste products or sludge are generally made of metal and formed with channels 2 on their surfaces. The opposing corrugated surfaces of the plates are lined with filter cloth 3, the waste products or sludge being pumped into the space 4 between the cloths and the whole then compressed. The expressed liquor filters out through the cloth and down through the passages 2ᵃ formed between the corrugated surfaces 2ᵃ of the plates and the back of the filter cloth. It is found that the severe corrosive action of the expressed liquors—particularly those recovered in chemical works—is very detrimental to the metal plates, the ridges 1ᵃ of the corrugations or channels wearing or corroding rapidly away, as indicated by the full wavy line in Fig. 2; the dotted lines indicate the original formation of the plate. A greater surface of filter cloth then becomes inactive, owing to the flattened ridges which it bears against, while the area of the passages 2ᵃ for the expressed liquor is considerably restricted and increased pressure must be exerted to effect filtration. With further wear filtration becomes very difficult and new plates must be fitted. By my invention these worn plates instead of being discarded are scaled and washed, and then coated with a composition consisting of cement—preferably Portland cement—sand, salt, and, if desirable, short cut hair or hemp. The following proportions are most suitable, 8 parts of cement, 2 parts sand, and 1 part salt. The worn plates are coated with a thickness of this composition corresponding to the required depth of the channels, and while still in a plastic state the channels are formed therein, which operation I have found may be easily and quickly performed by passing over the surface a comb furnished with teeth corresponding in shape to the profile of the channels desired. The composition is then allowed to set and harden.

Any inequalities on the surface of the worn plate assist the composition to adhere thereto, though it is quite adhesive when applied to new flat plates that may be required to be coated and faced in the manner described. Plates faced with this composition are exceedingly durable in resisting the corroding effect of the expressed liquor, and their use tends also to increase the life of the filter cloths which are liable to deteriorate more quickly when in contact with metal plates, while the cost of this method of renovating plates as compared with the provision of new metal plates is almost inconsiderable.

As mentioned before, new filter press plates instead of being formed with metallic corrugations on their surfaces as usual, may be provided with corrugations formed in a composition such as described which is mounted upon a skeleton or frame of metal and their durability thus considerably increased.

What I claim as my invention and desire to secure by Letters Patent is:—

1. The improved process for preparing filter press plates which consists in coating the skeletons or frames of the plates with a corrugated or channeled covering of cement or the like material, substantially as described.

2. The improved process for preparing filter press plates which consists in coating the skeletons or frames of the plates with a corrugated or channeled covering of a composition of cement, sand, and salt, substantially as described.

3. The improved process for renovating worn metallic filter press plates which consists in covering the worn plates with a composition of cement, sand, and salt, and subsequently corrugating or channeling the surface of the composition while in a plastic state, substantially as described.

In witness whereof I have hereunto set my hand in presence of two witnesses.

FRANK HOBBIS.

Witnesses:
A. J. DAVIES,
A. WATSON.